United States Patent
Loisel et al.

(10) Patent No.: US 9,367,482 B2
(45) Date of Patent: Jun. 14, 2016

(54) SYSTEMS AND METHODS TO EXTEND ROM FUNCTIONALITY

(71) Applicant: Maxim Integrated Products, Inc., San Jose, CA (US)

(72) Inventors: Yann Yves Rene Loisel, La Ciotat (FR); Yann Guade, La Ciotat (FR)

(73) Assignee: Maxim Integrated Products, Inc., San Jose, CA (US)

( * ) Notice: Subject to any disclaimer, the term of this patent is extended or adjusted under 35 U.S.C. 154(b) by 65 days.

(21) Appl. No.: 14/194,385

(22) Filed: Feb. 28, 2014

(65) Prior Publication Data

US 2014/0283103 A1  Sep. 18, 2014

(30) Foreign Application Priority Data

Mar. 15, 2013  (EP) .................................. 133053157

(51) Int. Cl.
*G06F 12/14* (2006.01)
*G06F 21/79* (2013.01)
*G06F 9/445* (2006.01)

(52) U.S. Cl.
CPC ........ *G06F 12/14* (2013.01); *G06F 8/66* (2013.01); *G06F 21/79* (2013.01)

(58) Field of Classification Search
CPC .................................. G06F 21/79; G06F 12/14
See application file for complete search history.

(56) References Cited

U.S. PATENT DOCUMENTS

| | | | | |
|---|---|---|---|---|
| 7,062,598 | B1 * | 6/2006 | Lapidus et al. | 711/102 |
| 7,464,248 | B2 * | 12/2008 | Chen et al. | 711/202 |
| 7,844,962 | B2 * | 11/2010 | Alexandre et al. | 717/168 |
| 8,689,204 | B2 * | 4/2014 | Kreek et al. | 717/168 |
| 2001/0052066 | A1 * | 12/2001 | Lee | G06F 8/66 |
| | | | | 712/248 |
| 2002/0120810 | A1 * | 8/2002 | Brouwer | 711/103 |
| 2004/0163080 | A1 * | 8/2004 | Menon et al. | 717/168 |
| 2005/0228959 | A1 * | 10/2005 | D'Albore | G06F 8/66 |
| | | | | 711/165 |
| 2006/0010328 | A1 * | 1/2006 | Esaka | G06F 21/85 |
| | | | | 713/190 |
| 2007/0198787 | A1 * | 8/2007 | Jessani et al. | 711/159 |
| 2008/0168275 | A1 * | 7/2008 | De Atley et al. | 713/189 |
| 2008/0184072 | A1 * | 7/2008 | Odlivak | G06F 11/3644 |
| | | | | 714/32 |
| 2008/0276011 | A1 * | 11/2008 | Bircher | G06F 12/023 |
| | | | | 710/8 |
| 2009/0013124 | A1 * | 1/2009 | Itkin | G06F 9/32 |
| | | | | 711/103 |
| 2009/0031107 | A1 * | 1/2009 | Henry | G06F 8/66 |
| | | | | 712/32 |
| 2010/0180104 | A1 * | 7/2010 | Henry et al. | 712/208 |
| 2011/0004721 | A1 * | 1/2011 | Smith et al. | 711/103 |

(Continued)

OTHER PUBLICATIONS

Extended European Search Report of Aug. 21, 2013, in European Application No. EP13305315 (7pgs).

(Continued)

*Primary Examiner* — Victor Lesniewski
(74) *Attorney, Agent, or Firm* — North Weber & Baugh LLP (57) ABSTRACT

Various embodiments allow for flexible and secure updates of drivers for numerous types of external memory devices by utilizing an address-selection mechanism within a simple and secure ROM code to enable the loading of a dynamic routine from an external source into a dynamic memory. In certain embodiments, the routine enables a simple and trusted framework to access and modify the content of any number of complex memory devices via simple commands without affecting existing security measures. This increases the usable lifetime of secure ROM code, simplifies device validation, and shortens the overall development cycle by extending the functionality of secure ROM code while keeping the ROM code and any programming thereof simple.

18 Claims, 4 Drawing Sheets

(56) References Cited

U.S. PATENT DOCUMENTS

2011/0004807 A1* 1/2011 Smith et al. .................. 714/766
2014/0244991 A1* 8/2014 Akdemir et al. ................ 713/2

OTHER PUBLICATIONS

Winter, Johannes, "Experimenting with ARM TrustZone—Or: How I Met Friendly Piece of Trusted Hardware," Trust, Security and Privacy in Computing and Communications (TRUSTCOM), 2012 IEEE 11th International Conference on, IEEE, Jun. 25, 2012, pp. 1161-1166, XP032233547, DOI: 10.1109/TRUSTCOM.2012.157, ISBN: 978-1-4673-2172-3 (6pgs).

European Search Report dated Aug. 21, 2013, in priority European Patent Application No. 13305315, filed Mar. 15, 2013.

Johannes Winter: "Experimenting with ARM TrustZone—Or: How I Met Friendly Piece of Trusted Hardware," Trust, Security and Privacy in Computing and Communications (TRUSTCOM) 2012 IEEE 11th International Conference on, IEEE, Jun. 25, 2012, pp. 1161-1166, DOI: 10.1109/TRUSTCOM.2012.157, ISBN: 978-1-4673-2172-3.

* cited by examiner

SYSTEMS AND METHODS TO EXTEND ROM FUNCTIONALITY

CROSS REFERENCE TO RELATED APPLICATIONS

This application claims foreign priority to European Patent Application No. 133053157, filed Mar. 15, 2013, which application is hereby incorporated herein by reference in its entirety.

BACKGROUND

A. Technical Field

The present invention relates to secure micro-controllers using nonvolatile memory, and more particularly, to systems, devices, and methods of extending the functionality of a ROM code to operate complex nonvolatile memory.

B. Background of the Invention

In the embedded software field, ever increasing requirements on rich platforms, such as 32-bit ARM core, and the introduction of a variety of proprietary and non-proprietary frameworks makes the task of developing secure drivers for external nonvolatile memory (NVM) devices (e.g., NAND, NOR, SPI flash, EEPROM, etc.) a complex undertaking, especially for ROM code developers. Generally, the paths of development for external NVMs cannot be anticipated or predicted by developers. Additionally, the fact that NVMs, such as NAND flash, evolve much more rapidly than ROM code increases the difficulty in supporting newer and more complex external NVMs without replacing or prematurely obsoleting existing secure ROM code.

Secure ROM code typically undergoes a series of rigorous validation processes prior to the integration and deployment in microprocessor devices. Any correction of detected post-release errors requires an unacceptable amount of effort and resources to remedy the consequences, and, in the worst case, may lead to inoperability of the entire chip. For example, a microprocessor may fail to startup if the ROM code is too complicated to be validated.

Secure updates of drivers for external NVM devices that are oftentimes permanently attached to a computing device, are typically managed by a host, such as a PC, coupled to a microcontroller. The secure ROM code operates as a gatekeeper that authenticates data packets that host and the ROM code exchange over a communication channel, such as serial, I²C, or USB link. Host and ROM code communicate using a protocol that may comprise several commands to enable the data exchange and allow the host to control the microcontroller.

As external memory management or a set of commands varies over time (e.g., ECC management, sectors size, standard commands), the existing ROM code can no longer securely update complex and previously unknown drivers to support the newer memory types or additional commands. Thus, there exists a need to securely and flexibly modify the content of external memory.

Existing approaches attempt to limit costly modifications or replacements of ROM code that communicates with external memory by employing indirection tables. Alternatives include replacing faulty or outdated ROM code with dynamic code that is pre-loaded into the internal ROM of the device. However, such approaches unnecessarily require additional processing time and consume additional memory in their struggle to cope with the latest technology available in the marketplace. In addition, existing architectures are incapable of providing secure ROM code support for multiple external memories at the same time, which further complicates microprocessor integration.

What is needed are tools for system designers to overcome the above-described limitations.

SUMMARY OF THE INVENTION

Various embodiments increase the usable lifetime of secure ROM code, simplify validation of the device in which the secure ROM code is embedded, and shorten the overall development cycle by extending secure ROM code functionality while keeping the ROM code and any programming thereof simple.

Certain embodiments allow for flexible and secure updates of drivers for any type of external memory device at low cost and without requiring embedded nonvolatile memory by the use of an address-selection mechanism within a simple and secure ROM code that is not tied to specific external memory.

In certain embodiments, the ROM code directly selects into which memory devices to write updated data received by an external source. Data may include an executable program that is written to a target memory address determined either by the ROM code routine or a routine within a secure dynamic memory.

Any security measures applied to a communication protocol between the external source and the memory device, such as the authentication of sequences of data remain unaffected. Similarly, the loading of data and a routine occurs through the same secure communication channel and uses the same protocol with the same high level of security, such that the level of security of the loading of a dynamic routine is no less than the level of security of the loading of data.

Certain features and advantages of the present invention have been generally described here; however, additional features, advantages, and embodiments are presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention. In this document, the term "routine" is sometimes to describe a flexible driver. However, it is understood that the term more generally refers to any sequence of operations. "Memory" is a generic term that refers to volatile and nonvolatile memory devices and any other storage elements recognized by one of skilled in the art. References herein to write operations equally apply to other operations, including less complex read operations.

Figure 1:
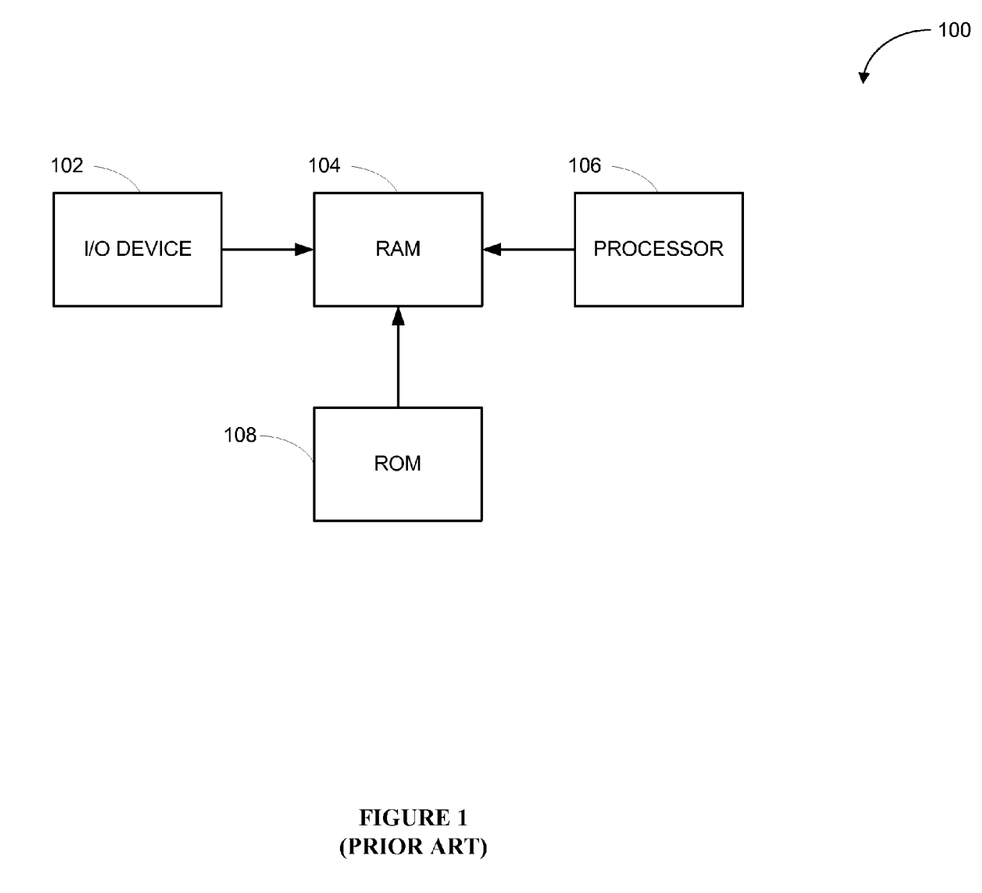
FIG. 1 is a block diagram illustrating a prior art approach to manage external memory by replacing ROM code.

FIG. 1 is a block diagram illustrating a prior art system for managing external memory by replacing ROM code. Prior art system 100 comprises I/O device 102, RAM 104, processor, 106, and ROM 108. I/O device 102 is an input/output device that contains a routine that is an updated version of a routine stored in a ROM code in ROM 108. Generally, the routine in ROM 108 is copied into RAM 104 at the startup of system 100. Processor 106 is a device capable of modifying or configuring data stored in RAM 104.

In operation, once a routine is copied form a ROM code into RAM 104, processor 106 determines whether I/O device 102 contains an update for the routine transferred to RAM 104. If so, processor 106 may overwrite the previously loaded routine from RAM 104. As a result, instead of using the routine previously stored in ROM 108 at startup, processor 106 replaces a routine in RAM 104 with an updated version provided by I/O device 102. However, this approach has significant drawbacks in replacing ROM code requires additional processing time and unnecessarily consumes additional RAM. Therefore, it would be desirable to be able to extend a ROM routine without having to replace ROM code.

Figure 2:
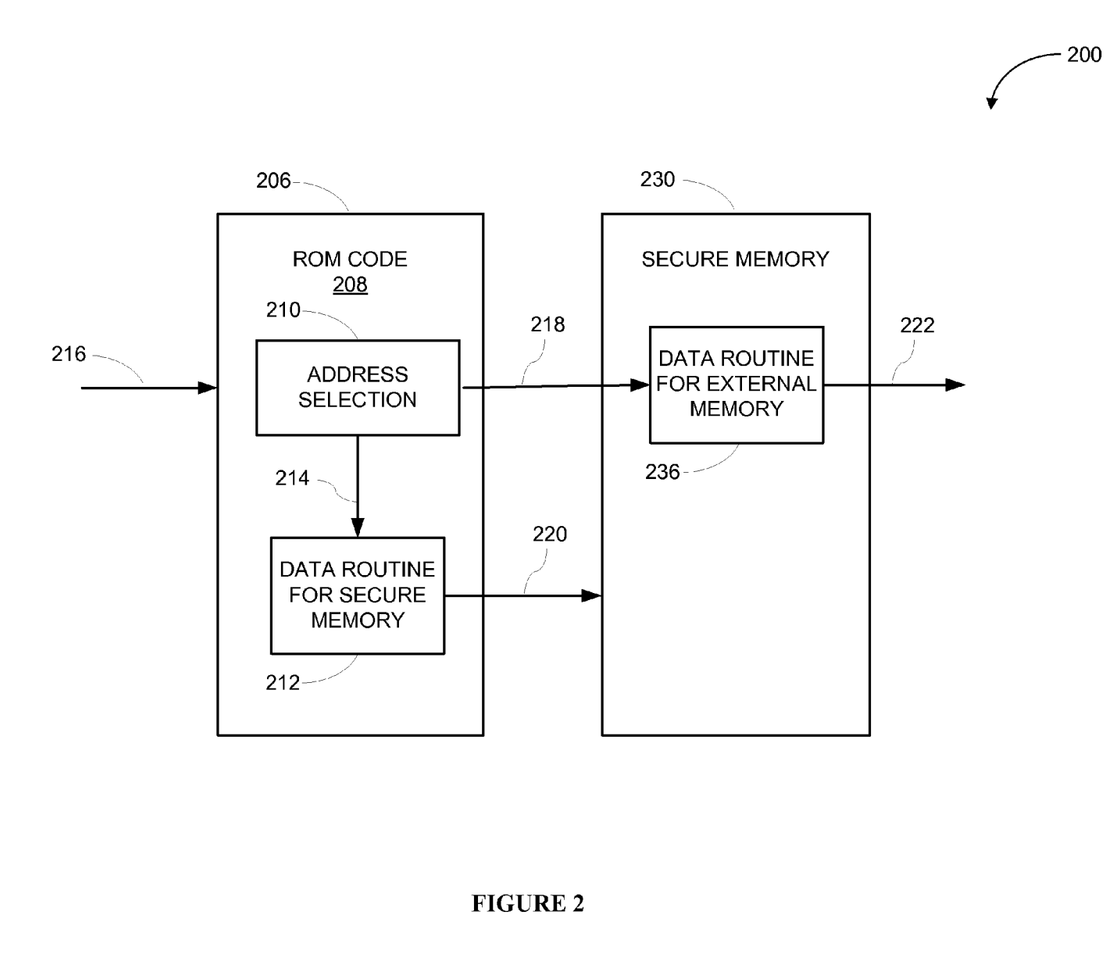
FIG. 2 is a general illustration of a memory configuration utilizing address selection according to various embodiments of the invention.

FIG. 2 is a general illustration of a memory configuration utilizing address selection according to various embodiments of the invention. System 200 comprises ROM 206 and secure memory 230. ROM 206 typically is a read only memory device that comprises ROM code 208, which is configured to communicate with secure memory 230 via a communication protocol. The communication protocol may comprise basic commands to read, write, erase, and compare data. Commands and data 216 are received by ROM 206 and processed by ROM code 208. ROM code 208 comprises address selection module 210, which is a mechanism for address selection, such as an address selection table or memory map. Secure memory 230 comprises one or more routines that can be accessed by ROM code 208.

Secure memory 230 may be implemented, for example, as an embedded, battery-backed RAM, a nonvolatile memory, such as flash memory, a one-time programmable memory, etc. Secure memory 230 is typically known to the developer and is recognized by ROM code 208, such that secure memory 230 can be operated without requiring an outside library. Both ROM code 208 and secure memory 230 comprise one or more routines 212, 236.

A routine is any process, sequence of steps, or any combination or subset thereof that may be called or invoked, for example, by a command. Routines may be developed to interact with existing ROM code 208 to extend the functionality of the ROM code 208. A routine may be used, for example, to operate a plurality of external memory devices (not shown). In one embodiment, one or more routines may be pre-installed in secure memory 230 or any other dedicated memory.

In one embodiment, data routine for secure memory 212 and data routine for external memory 236 are loaded from an embedded memory device (e.g., flash memory) or a backed-up RAM (not shown), such that routines 212, 236 do not need to be reloaded, e.g., at startup. Additional or updated routines that are to be stored in secure memory 230 may be used. In this manner, the added routines can be used to extend older ROM-based routines. While the added or updated routines may comprise the same commands as older routines (e.g., read, write, erase), they may effectuate different results when, for example, applied to external memory.

In one embodiment, data routine for external memory 236 is pre-loaded into secure memory 230. Address selection module 210 aids in making a determination whether to access data routine for secure memory 212 or data routine for external memory 236.

In detail, ROM code 208 in ROM 206 receives data 216, for example, via a host device (not shown). Data 216 comprises a target address range to which data 216 is to be written. The location of the target address range may be, for example, in secure memory 230 of a microprocessor or in an external memory (not shown). Based on the address range, ROM code 208 by using address-selection module 210, determines whether the target address range is located in an address range within secure memory 230 or external memory and transmits data 216 accordingly.

Upon determining that the target address range is located in an address range within secure memory 230, i.e., the target address is within a range that is already handled by ROM code 208, ROM code 208 selects data routine for secure memory 212 to perform the command. Alternatively, if ROM code 208 determines that the target address range for the command lies in an address range within an external memory, i.e., target address is within a range that is handled by secure memory 230, ROM code 208 selects data routine for external memory 236 in secure memory 230 to perform the command.

A routine within ROM code 208 may be modified by modifying the selection address so as to instruct address selection module 210 to redirect from a defective ROM routine to a routine that comprises a correction for the defective ROM routine, for example, to reload a corrected version of the source code.

As a result, a plurality of internal and external memory devices of the same or different type may be coupled to secure memory 230 and updated without increasing the complexity or validation of ROM code 208. The flexibility to modify the content of internal and external memory in this way enables ROM code developers to extend the existing features of secure ROM code 208.

Figure 3:
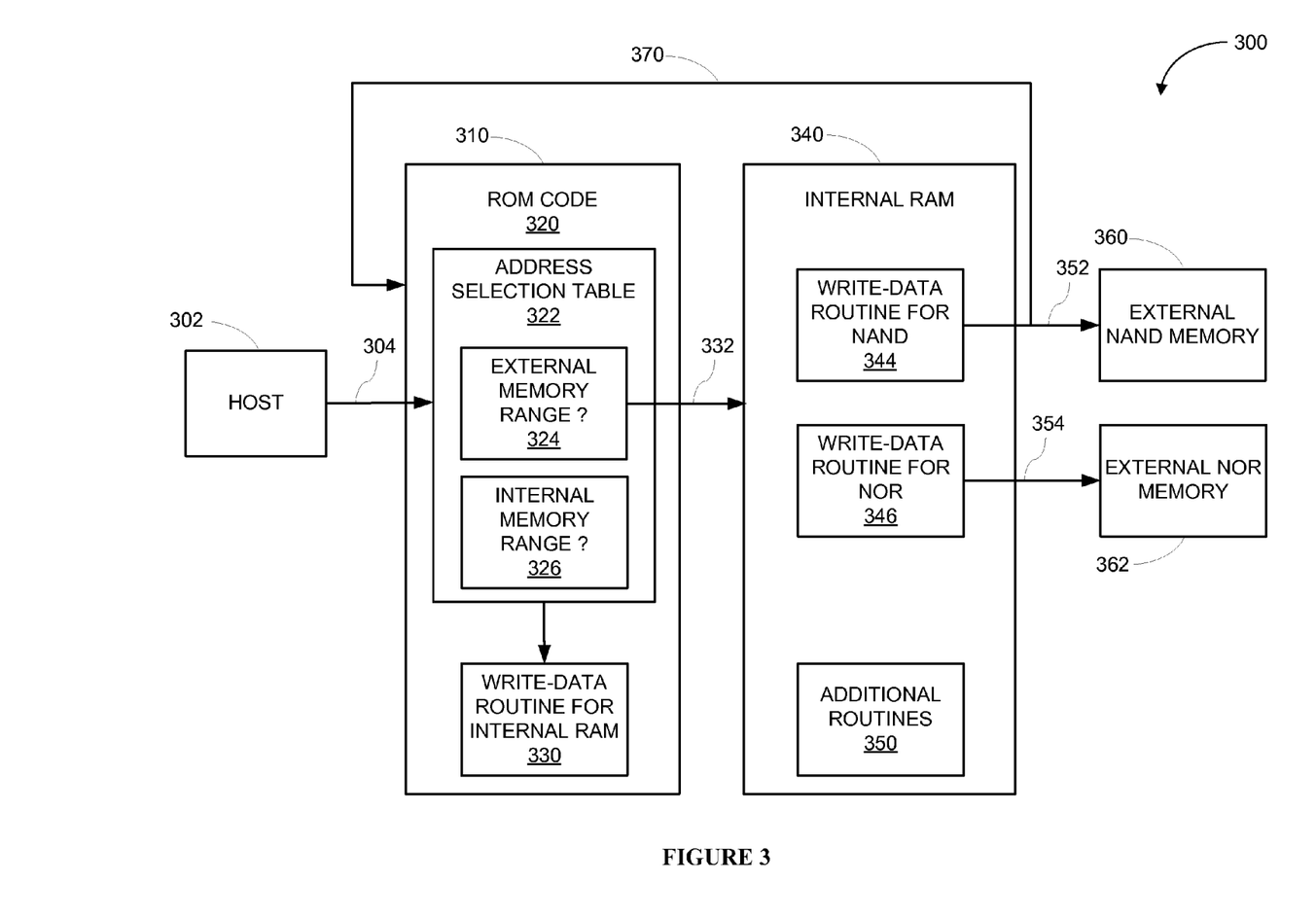
FIG. 3 is an exemplary implementation of a memory configuration according to various embodiments of the invention.

FIG. 3 is an exemplary implementation of a memory configuration according to various embodiments of the invention. System 300 comprises host 302, ROM 310, internal RAM 340, and external memory 360, 362. Host 302 is any device configured to communicate with ROM 310, for example, a personal computer. ROM 310 is a read only memory device that comprises ROM code 320 and communicates with host 310 and internal RAM 340 via communication protocol 304.

Protocol 304 is a host-microcontroller protocol that enables communication of basic commands, such as WRITE DATA that may be used to write data to a specified address location, ERASE DATA that may be used to erase a mirror area, and COMPARE DATA that may be used to compare data to previously written data. Data is any data, including user data, application data, configuration data, firmware, driver data, etc.

ROM code 320 comprises address selection table 322 and is configured to execute default code or, for example, perform a write-of-data routine in response to a WRITE DATA command. ROM code 320 is further configured to communicate with internal RAM 340. Internal RAM 340 comprises a plurality of routines 344, 346 that can be accessed by ROM code 320 by the basic commands or any specialized commands for routine loading, enrollment, routine execution, etc. In this example, routines may include a software or firmware driver for some type of memory. One or more routines may be used to operate external memory 360, 362, which is implemented as nonvolatile memory. External memory 360, 362 is any combination of memory devices, such as nonvolatile NAND memory 360 and NOR memory 362. Each may comprise external routines to processes and execute the data received.

ROM code 320 and RAM 340 comprise routines 330 and 344-350, respectively. Routines may be customized to accommodate a specific memory manufacturer, memory model, or type of memory device (e.g., a NAND erase operation is not the same as a NOR erase operation). In one embodiment, prior to using address-selection table 322, host 302, via protocol 304, provides one or more routines that are loaded and enrolled into secure internal RAM 340 of a secure microcontroller. Enrollment may be accomplished by populating or modifying selection table 322, which may initially be empty or comprise one or more routines 330 stored in ROM code 320 together with an address range in internal RAM 340.

Host 302 may also provide new routines 344, 346, 350 to be stored in RAM 340 together with any target address range in external memory 360, 362. As a result, ROM 310 is able to utilize routine 344, 346, 350 to extend the functionality of its existing ROM code 320, for example, in order to include additional commands.

In operation, host 302, via protocol 304, transmits data to ROM code 320 that is to be written into at least one of internal RAM 340 or external memory 360, 362 together with an appropriate target address range. For example, host 302 may request to download updated firmware into a device embedded in system 300. Host 302 may use the same protocol 304 to transmit a WRITE DATA command together with a data packet to be programmed to a predetermined address or address range to ROM code 320. The target address range represents the location of data that is to be programmed at a target memory, such as internal RAM 340 or external memory 360, 362.

Address-selection table 322 receives from host 302 a target address range for a command (e.g., "write data" sent by host 302). Based on the address range, ROM code 320 by using address-selection table 322, determines whether the target address range, is located in an address range within internal RAM 340 or in an address range within external memory 360, 362. If the target address range is located in an address range within internal RAM 340, ROM code 320 directly selects ROM-stored routine 330 to perform the write operation to RAM 340 without using any RAM-based routines 344, 346, 350 stored in internal RAM 340. Conversely, if, based on address-selection table 322, ROM code 320 directly determines that the target address range for the command lies in an address range within external memory 360, 362, ROM code 320 selects one of RAM-based routine 344, 346, 350 in internal RAM 340 to perform the write operation to the external address within external memory 360, 362. In that case, the selected RAM-based routine 344, 346, or 350 manages the write operation to external memory 360, 362 by transferring the data and the address range to the appropriate external memory 360, 362.

In one example, host 302 sends data packets to be written into external NAND memory 360 together with a corresponding target address range to ROM code 320. Based on address-selection table 322, which indicates that the target address range for the command lies in an address range within external NAND memory 360, ROM code 320 selects RAM-based NAND routine 344 located within internal RAM 340 and transfers data packets 332 received from ROM code 310 to the appropriate memory range within NAND routine 344, for example, by executing a write operation. Similarly, if the target address range points to NOR routine 346, ROM code 320 will select to transfer the data to the NOR routine 346 to perform the write operation. In one embodiment, RAM-based routine 344, 346, 350 is previously loaded into internal RAM 340 and immediately available to be processed, thereby, eliminating the need to load a routine.

Following the selection via address-selection table 322 the selected routine then processes the data according to the command received. It is understood that processing the data may comprise any complex task, such as managing an array prior to writing data, formatting external memory, etc. These processes are abstracted from host 302 in that ROM code 320, which receives data commands and address ranges is generally not aware of the complexity of the processing following the selection. Unlike routine 344, 346, 350, ROM code 320 may not even know the exact type of external device 360, 362 that is coupled to internal RAM 340.

A plurality of memory devices, including internal memory devices, can be supported at the same time. Memory devices may be added, removed, or replaced without affecting either host 302 or the complexity of ROM code 320. Similarly, protocol 304 or the sequence of commands between host 302 and ROM code 320 will not have to be modified to accommodate one or more new or updated devices.

Internal ROM 340 may use RAM-based routine 344, 346, 350 to send to ROM code 320 any kind of feedback response 370, such as an error code regarding the completion of a command. In one embodiment, feedback loop 370 may be used to request new data until all available data packets are transmitted from host 302 to ROM code 320 and written into their destinations. Similarly, ROM code 320 may send a feedback response (not shown) to host 302, for example, according to the requirements of protocol 304, such that in cases of an error host 302 can take appropriate action.

One skilled in the art will appreciate that communication protocol 304 may comprise security features, such as digital signatures, command identifiers, or keys to verify that the data received by ROM code 320 is sent by an authorized source.

Figure 4:
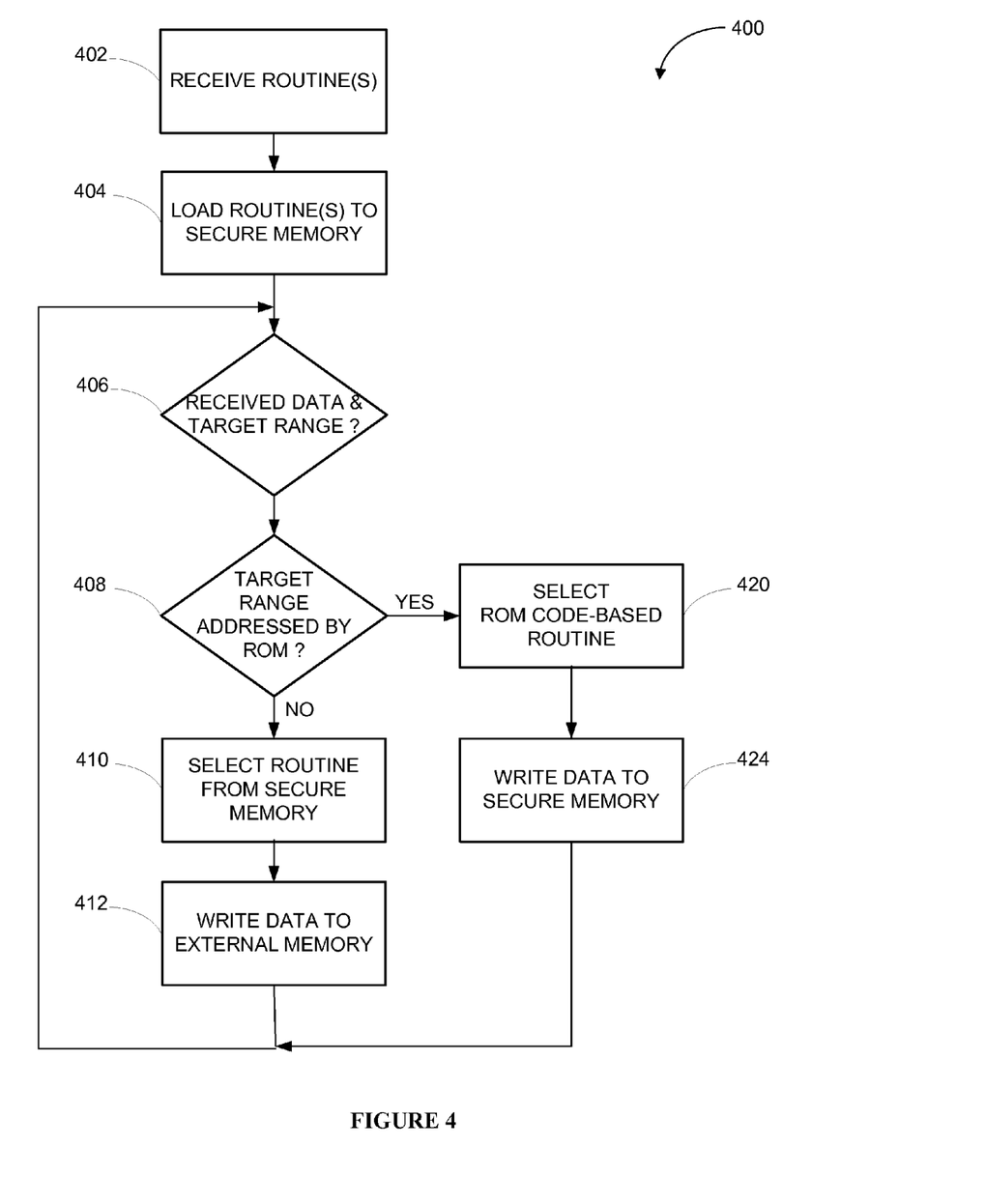
FIG. 4 is a flowchart of an illustrative process for extending ROM functionality in accordance with various embodiments of the invention.

FIG. 4 is a flowchart of an illustrative process for extending ROM functionality in accordance with various embodiments of the invention. The process starts at step 402 when a ROM receives one or more routines from a host device. The routines comprise any type of routines, including routines that perform additional optional steps that, for example, are intended to decrease the time of data transfer. For this purpose, the routine may decompress previously received, compressed data before the routine performs any operations to write to an internal or external nonvolatile memory. This step may occur outside of the visibility of the ROM code, including the writing of the expanded data to an external nonvolatile memory.

At step 404, the one or more routines are loaded into a secure memory.

At step 406, it is determined whether data and a target address range have been received, for example, by the ROM code from the host device. Data may comprise data to be programmed at the target address range.

At step 408, it is determined whether the target address range has been already addressed by the ROM. If so, then at step 420 a ROM-code based routine is selected within the ROM and, at step 422 the data is written into the secure memory.

Otherwise, at step 410 a routine from the secure memory is selected and, at step 412 the data is written, for example, into an external memory. Secure memory may comprise one or more routines from which a selection is made. It is understood that in an alternative embodiment, the data may be written into an internal memory.

In either case, after step 412 or 424 has been completed, the process may optionally return to step 406 to determine whether the ROM code received any additional data and target address ranges to be processed by the ROM.

One skilled in the art will appreciate that routines for two or more memory devices may be made available to accommodate multiple or changing devices. The routines may be stored at different locations within, for example, the secure internal memory.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A system to extend the functionality of a ROM code, the system comprising:
    a ROM of a device coupled to receive data and an address range, the ROM comprises the ROM code that in response to receiving the address range makes a selection regarding a target location where to write the data, the selection regarding the target location being based on a determination by the ROM code as to whether the address range is addressed by the ROM code; and
    a secure memory coupled to the ROM, being internal to the device and being recognized by the ROM code, the ROM code being extended by selecting a routine that is accessed from the secure memory, the ROM code optionally selects:
        a first routine accessed from and performed by the ROM code to write the data to the secure memory if the address range is addressed by the ROM code, and
        a second routine accessed from and performed by the secure memory to write the data to an external memory if the address range is addressed by the secure memory.

2. The system according to claim 1, further comprising a host configured to provide the data and the address range to the ROM via a secure protocol.

3. The system according to claim 2, wherein the host further provides a command to the ROM.

4. The system according to claim 1, the second routine modifies a content of the external memory.

5. The system according to claim 4, wherein the external memory is a nonvolatile memory.

6. The system according to claim 1, wherein the secure memory is dynamic.

7. The system according to claim 1, wherein the secure memory is one of an embedded RAM, a nonvolatile memory, and a one-time programmable memory.

8. The system according to claim 1, wherein the data comprises one of a driver update for the external memory, user data, application data, configuration data, and firmware.

9. The system according to claim 1, wherein the ROM and the secure memory are embedded in a microcontroller.

10. The system according to claim 1, further comprising a feedback mechanism between the secure memory and the ROM.

11. A method to extend the functionality of a ROM code, the method comprising:
    receiving data at a ROM of a device, the ROM comprising the ROM code;
    receiving, at the ROM, an address identifier that identifies a target address range to which the data is to be written;
    determining, by the ROM code and from the address identifier, whether the target address range is addressed by the ROM code or by a secure memory that is internal to the device and recognized by the ROM code;
    if the target address range is addressed by the ROM code:
        selecting a first routine that is accessed from the ROM code and is performed by the ROM code;
        executing the first routine to write the data to the secure memory; and
        returning to receiving an additional address identifier; and
    if the target address range is addressed by the secure memory, extending the ROM code by:
        selecting a second routine that is accessed from the secure memory and is performed by the secure memory;
        executing the second routine to write the data to an external memory; and
        returning to receiving an additional address identifier.

12. The method according to claim 11, wherein receiving data comprises communicating over a secure protocol.

13. The method according to claim 11, further comprising receiving the second routine from a host.

14. The method according to claim 11, further comprising loading the second routine into the secure memory from an embedded memory device.

15. The method according to claim 11, further comprising pre-installing the second routine to the secure memory.

16. The method according to claim 11, further comprising executing the data in one of the external memory and the secure memory.

17. The method according to claim 11, further comprising modifying a selection table via the second routine.

18. The method according to claim 11, further comprising redirecting from the first routine to the second routine.

* * * * *